June 17, 1924.
P. SATTERLEE
1,498,207
METAL BENDING DEVICE
Filed April 18, 1923
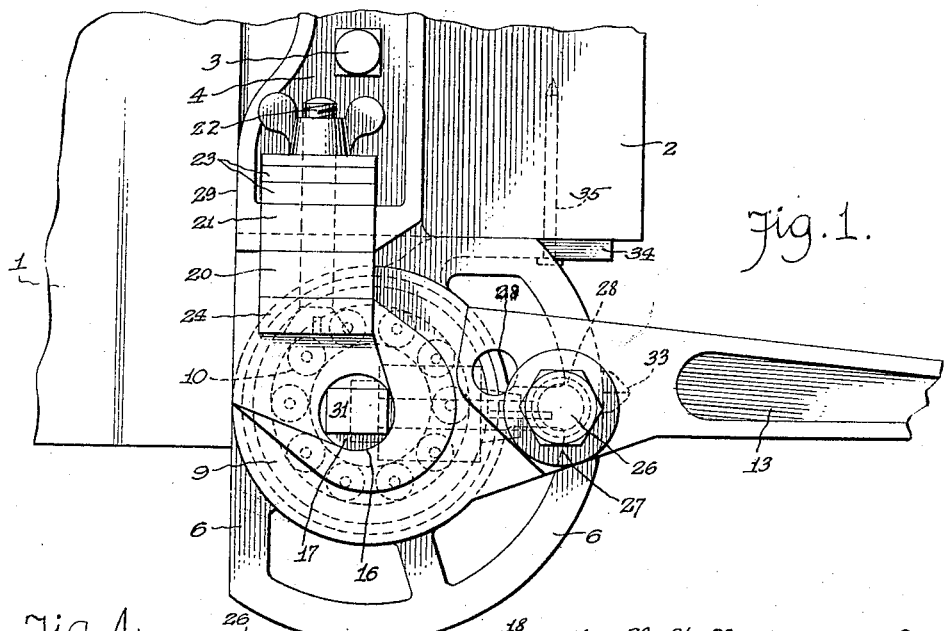
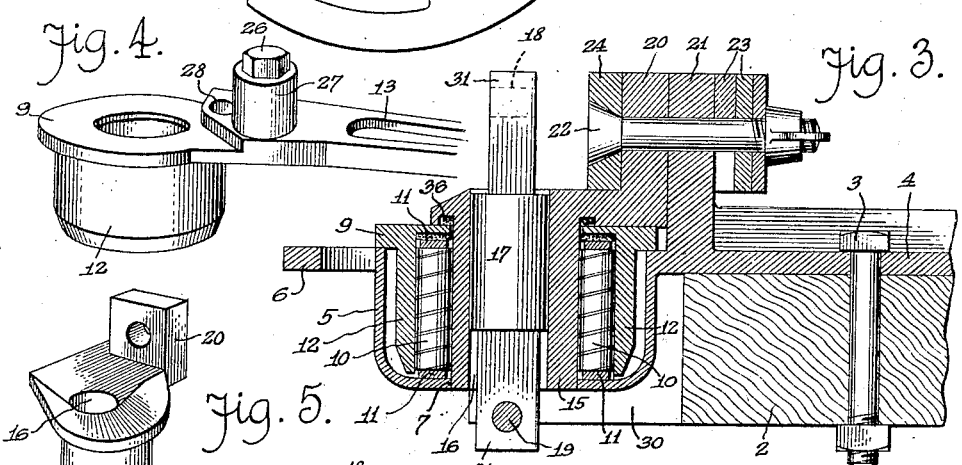
Inventor
Percy Satterlee,
Attorneys Patented June 17, 1924.

1,498,207

UNITED STATES PATENT OFFICE.

PERCY SATTERLEE, OF DETROIT, MICHIGAN.

METAL-BENDING DEVICE.

Application filed April 18, 1923. Serial No. 632,809.

*To all whom it may concern:*

Be it known that I, PERCY SATTERLEE, a citizen of the United States of America, residing at Detroit, in the county of Wayne and State of Michigan, have invented certain new and useful Improvements in Metal-Bending Devices, of which the following is a specification, reference being had therein to the accompanying drawings.

In my Patent No. 1,319,798, granted Oct. 28, 1919, there is disclosed a metal bending device that may be advantageously employed for expeditiously and safely bending, angle irons, rods, wires and various kinds of stock, and I now aim to improve my former device by providing a more substantial construction and arranging the parts so that friction is reduced to a minimum and the operation of bending a piece of stock made less arduous and with less probability of the parts being broken or stressed to such an extent that accurate bending could not be easily accomplished.

My improvement will be hereinafter described and then claimed and reference will now be had to the drawing, wherein—

Figure 1 is a plan of a portion of the metal bending device;

Fig. 2 is a vertical longitudinal sectional view of the same;

Fig. 3 is a vertical transverse sectional view of the device;

Fig. 4 is a perspective view of the inner end of the bending arm of the device, and Fig. 5 is a similar view of a detached part.

In the drawing, the reference numeral 1 denotes a bench or support having a side wall or edge thereof provided with a shelf 2 forming a side wall or abutment 29 and detachably mounted on the shelf 1 against the wall 29, by nut equipped bolts 3, is a stationary arm 4 provided with a cylindrical or cup shaped housing 5 within a cut away corner or recess 30 of the bench 1 and with a flat semi-circular head 6 at the top of the housing 5. The housing 5 has a concentric bottom opening 7 and on the bottom of said housing, at one side of the opening 7 is an apertured boss 8. The boss 8 serves as a bottom abutment, as will hereinafter appear.

Mounted on the bottom wall of the housing 5 are anti-frictional roller bearings 10 within a suitable cage 11, and surrounding said roller bearings is a sleeve hub 12 of a movable arm 13, said sleeve hub being carried by a substantially circular head 9 at the inner end of the movable arm 13 and bearing upon the circular head 6 of the housing 5.

Extending into the sleeve hub 12 of the movable arm 13 is a socket 15 which extends into the opening 7 of the housing bottom wall and is provided with a longitudinal eccentrically disposed cylindrical opening 16 for an invertible post 17 of greater length than the socket 15 so that its shank ends 31 may protrude from said socket. Both shank ends 31 of the invertible post 17 are apertured, as at 18, so that either end may be connected to the apertured boss 8 of the housing by a nut equipped bolt 19, said bolt extending through a depending apertured lug 32 of the socket 15, thus fixing the post relative to the housing and by virtue of said lug and post causing the housing 5 to brace the socket 15. The shank end 31 of the post may be set in vertical planes at a right angle to each other, or one offset relative to the other.

The upper end of the socket 15 has a support 20 attached to an upstanding lug or abutment 21 carried by the stationary arm 4. A nut equipped bolt 22 forms the connection between the support 20 and the lug 21 and said bolt may be provided with slotted shims or washers 23 and a face plate 24, said face plate confronting the upper shank end 31 of the invertible post 17. It is between the shank end of the post 17 and the face plate 24 that a piece of stock is placed to be bent and it is through the medium of the shims or washers 23 that the space between the post 17 and the face plate 24 may be increased or decreased to accommodate a desired piece of stock.

Mounted in the movable arm 13 is a stud or cap screw 26 provided with an anti-frictional roller 27, and the arm 13 may have one or more openings 28 so that the stud may be adjusted relative to the inner end of said movable arm. The stud roller 27 is adapted to engage a piece of stock held between the post 17 and the face plate 24 of the abutment, and with the movable arm 13 in the position shown in Fig. 1, said arm can be swung in a clockwise direction to bend the stock against the post 17.

With the housing 5 braced by the bench 1 and provided with the anti-frictional rollers 10, the sleeve hub 12 has a long bearing within the housing and is positively retained axially of said housing so that any stresses or strains on the pivot of the movable arm 13 will be distributed to the anti-frictional roller bearings and from said bearings to the housing. This improvement provides a more substantial and lasting device than disclosed in my former patent, capable of bending heavy stock.

The bottom of the housing 5 has an opening 25 which permits of scales, dirt and other matter working out of the housing, and the lower face of the movable arm 13 has a pointer 33 movable relative to the edge of the head 6, which may be graduated or marked to permit of different or uniform bends being made.

The housing 5 and the head 6 may have a side flange 34 secured to a wall of the recess 30 by a nail 35 or other fastening means, so that the device will be firmly anchored relative to the bench and its shelf.

A dust ring or guard 36 may be mounted in the support 20 to engage the head 9 and prevent dirt from entering the sleeve hub 12 of the movable arm 13 and the housing 5 of the stationary arm 4.

While in the drawing there is shown a preferred embodiment of my invention, it is to be understood that the structural elements are susceptible to such changes and modifications as set forth in the appended claims.

What I claim is:—

1. A metal bending device comprising a stationary arm, a housing carried by said arm, an abutment on said arm, a movable arm having a sleeve hub in said housing, a stud on said movable arm, a socket attached to said abutment and extending into the sleeve hub of said movable arm, and a post carried in the socket.

2. A metal bending device as called for in claim 1, wherein said post is invertible and has an end thereof detachably connected to the housing of said stationary arm.

3. A metal bending device as called for in claim 1, and anti-frictional roller bearings between the walls of said housing and the sleeve hub of said movable arm.

4. A metal bending device comprising a housing, an abutment at one side thereof, a movable arm having a sleeve hub in said housing, a stud carried by said movable arm, a socket extending into the sleeve hub of said movable arm and attached to said abutment, and a post in said socket.

5. A metal bending device as called for in claim 4, and anti-frictional roller bearings between the walls of said housing and the sleeve hub of said movable arm.

6. A metal bending device as called for in claim 4, wherein said post is invertible and has an end thereof detachably connected to said housing.

7. A metal bending device comprising a fixed housing having an abutment, a socket attached to the abutment of said housing, a post in said socket, a movable bending arm having a sleeve hub in said housing, a stud carried by said arm and adapted to cooperate with said post and the abutment of said housing in bending stock, and an anti-frictional bearing interposed between said socket and the sleeve hub of said movable arm.

8. A metal bending device as called for in claim 7, wherein said post is invertible and adapted to have an end thereof fixed to said housing.

In testimony whereof I affix my signature in presence of two witnesses.

PERCY SATTERLEE.

Witnesses:
 ANNA M. DORR,
 LEWIS E. FLANDERS.